United States Patent
Venkataramanan et al.

(10) Patent No.: US 10,536,549 B2
(45) Date of Patent: Jan. 14, 2020

(54) METHOD AND APPARATUS TO ACCELERATE SESSION CREATION USING HISTORICAL SESSION CACHE

(71) Applicant: FREESCALE SEMICONDUCTOR, INC., Austin, TX (US)

(72) Inventors: Subhashini A. Venkataramanan, Fremont, CA (US); Srinivasa R. Addepalli, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 594 days.

(21) Appl. No.: 14/968,983

(22) Filed: Dec. 15, 2015

(65) Prior Publication Data

US 2017/0171343 A1 Jun. 15, 2017

(51) Int. Cl.
*H04L 29/08* (2006.01)
*H04L 29/06* (2006.01)

(52) U.S. Cl.
CPC ...... *H04L 67/2842* (2013.01); *H04L 63/0236* (2013.01); *H04L 63/101* (2013.01); *H04L 67/10* (2013.01); *H04L 67/141* (2013.01)

(58) Field of Classification Search
CPC .................................................. H04L 63/0236
See application file for complete search history.

(56) References Cited

U.S. PATENT DOCUMENTS

| | | | | |
|---|---|---|---|---|
| 6,173,364 B1* | 1/2001 | Zenchelsky | ......... | H04L 63/0254 711/118 |
| 6,854,063 B1* | 2/2005 | Qu | ...................... | H04L 63/0245 370/392 |
| 7,180,887 B1* | 2/2007 | Schwaderer | .......... | H04L 45/742 370/351 |
| 7,385,938 B1* | 6/2008 | Beckett | ............... | H04L 41/0813 370/254 |
| 7,779,021 B1* | 8/2010 | Smith | ................. | G06F 11/3438 707/760 |
| 7,966,655 B2* | 6/2011 | Acharya | ............. | H04L 63/0263 726/11 |

(Continued)

OTHER PUBLICATIONS

NPL Patent Search (Google Scholar) (Year: 2019).*

(Continued)

*Primary Examiner* — John B King
*Assistant Examiner* — Richard W Cruz-Franqui (57) ABSTRACT

A method and apparatus receive packets, wherein the packets comprise headers, and the headers comprise session parameter values, route the packets in response to the session parameter values matching an active traffic session entry of the active traffic session entries in an active traffic session cache memory, match the session parameter values against historical session entries in an historical session cache memory in response to the session parameter values not matching any active traffic session entry of the active traffic session entries in the active traffic session cache memory, wherein the historical session entries for traffic sessions in the historical session cache memory persist after the traffic sessions are no longer active, and, in response to the session parameter values not matching any historical session entry of the historical session entries in the historical session cache memory, performing a packet security check on the packets.

17 Claims, 3 Drawing Sheets

(56) References Cited

U.S. PATENT DOCUMENTS

| | | | | |
|---|---|---|---|---|
| 8,060,927 B2* | 11/2011 | Engdahl | H04L 63/0254 | 726/13 |
| 8,339,959 B1* | 12/2012 | Moisand | H04L 63/0236 | 370/235 |
| 8,837,322 B2* | 9/2014 | Venkataramanan | H04L 47/2458 | 370/253 |
| 9,172,629 B1* | 10/2015 | McRae | H04L 45/00 | |
| 9,524,324 B1* | 12/2016 | Lakhani | G06F 16/27 | |
| 2003/0154399 A1* | 8/2003 | Zuk | H04L 63/0254 | 726/11 |
| 2004/0073630 A1* | 4/2004 | Copeland | H04L 67/02 | 709/218 |
| 2006/0155862 A1* | 7/2006 | Kathi | H04L 45/38 | 709/229 |
| 2009/0138577 A1* | 5/2009 | Casado | H04L 41/06 | 709/220 |
| 2010/0195513 A1* | 8/2010 | Yang | H04L 63/0236 | 370/252 |
| 2010/0332630 A1* | 12/2010 | Harlow | H04L 41/048 | 709/221 |
| 2011/0080916 A1* | 4/2011 | Davies | H04L 49/1546 | 370/401 |
| 2012/0044935 A1* | 2/2012 | Hama | H04L 12/4625 | 370/389 |
| 2012/0320788 A1* | 12/2012 | Venkataramanan | H04L 47/2458 | 370/253 |
| 2013/0107883 A1* | 5/2013 | Ashwood-Smith | H04L 45/16 | 370/390 |
| 2013/0227674 A1* | 8/2013 | Anderson | H04L 63/1441 | 726/15 |
| 2013/0232278 A1* | 9/2013 | Zou | H04L 61/251 | 709/245 |
| 2014/0334491 A1* | 11/2014 | Pazhayakath | H04L 45/7453 | 370/392 |
| 2015/0172186 A1* | 6/2015 | Kizu | H04L 45/34 | 370/392 |
| 2015/0221007 A1* | 8/2015 | Peter | G06Q 30/0613 | 709/229 |
| 2015/0236863 A1* | 8/2015 | Castro Castro | H04L 12/1407 | 370/259 |
| 2015/0281125 A1* | 10/2015 | Koponen | H04L 45/64 | 711/122 |
| 2015/0358288 A1* | 12/2015 | Jain | H04L 63/0254 | 726/13 |
| 2016/0359740 A1* | 12/2016 | Parandehgheibi | H04L 63/1425 | |
| 2016/0359872 A1* | 12/2016 | Yadav | H04L 43/04 | |
| 2017/0111272 A1* | 4/2017 | Liu | H04L 67/141 | |
| 2017/0171343 A1* | 6/2017 | Venkataramanan | H04L 67/2842 | |
| 2018/0295060 A1* | 10/2018 | Wickeraad | H04L 45/7457 | |

OTHER PUBLICATIONS

Miller, David S., "Removing the Linux Routing Cache," Presentation, Red Hat Inc., Columbia University, New York, 2012; printed from <<http://vger.kernel.org/~davem/columbia2012.pdf>> on Dec. 14, 2015; 36 pages.

* cited by examiner

METHOD AND APPARATUS TO ACCELERATE SESSION CREATION USING HISTORICAL SESSION CACHE

BACKGROUND

Field of the Disclosure

This disclosure relates generally to computer networking and more particularly to network firewalls.

Background of the Disclosure

Network security is important for protecting against unauthorized data communications. A firewall can serve as a filter to filter out unauthorized data communications. However, the processing steps taken to perform filtering at the firewall can impair the performance of the firewall and slow down legitimate data communications.

Security engines such as a stateful inspection firewall, maintain a session table to avoid rule set lookup on a per packet basis. A traffic session can be setup when the first packet of a transmission control protocol (TCP) or user datagram protocol (UDP) session matches successfully an 'allow' rule in a firewall access control list (ACL) or internet protocol security (IPsec) policy database. Each entry in these tables is identified with five tuples, or attributes characteristic of a session that are extracted from the packet headers—a source internet protocol (IP) address (SIP), a destination IP address (DIP), a source port (SP), a destination port (DP), and a protocol.

An enterprise firewall can be situated at the edge of the enterprise, inspecting incoming and outgoing packets, and setting up sessions as required. Performance numbers measuring session setup (e.g., connections per second) are used to rate the capacity or capability of a security device. The first packet of a session (prior to session establishment) undergoes many checks and setups before the session is established. Security checks include IP address checks and spoof checks. An IP address check includes invalid address check, invalid broadcast or multicast address values or loopback address in source IP address field, etc. A spoof check includes a reverse route lookup with the source IP field to ensure that the resulting match happens to the same interface or port on which the packet arrived. With policy based routing and multiple routing tables, these operations are expensive in terms of time and resources needed to perform them.

In a typical client server connection, these checks happen twice at the session establishment time—one for client to server packet and the second for server to client packet. A packet determined as 'good' is then compared with the ACL. If the packet is allowed, a session is created, so that subsequent packets of the session need not go through these checks. Resource expensive operations such as route lookup happen during session establishment time, which directly impacts the connection setup rate.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

An historical session cache is provided to retain parameter values, referred to as tuples, associated with historical traffic sessions that were previously created even when those historical traffic sessions are no longer active. When packets that would initiate creation of a traffic session are received, tuples are extracted from the packets and compared, in some form, to the tuples stored in the historical session cache. If a match is found, security checks can be avoided, saving time in setting up the traffic session, as the security checks would have already been performed successfully on a similar previous traffic session.

In practice, traffic patterns indicate that there are frequently repetitive connections from the same client to a particular server machine, wherein the several connections may each specify a different source port. For example, when a client tries to connect to a website such as a social media website, 30 to 40 connections may be established immediately and simultaneously to the server. This prediction could be possibly exploited to predict future sessions that might get established, by eliminating these first packet checks. A cache could be built for the previously occurred versions of predicted future sessions without source ports so that sessions with the same or different source ports but with the same source IP address and the same destination IP address may be rapidly created. The previously occurred versions of the sessions have a trustworthiness established as a similar session with all tuples other than source sort has undergone initial IP address checks as well as spoof checks. This cache could potentially help establish future sessions faster by eliminating these first packet checks, thus increasing the connection setup rate.

By establishing an historical session cache, for repetitive sessions from same client to server with varying source port that can be trusted, and omitting performing first packet of session checks such as IP address validation and spoof checks for packets corresponding to tuples that match stored tuples in the historical session cache, performance can be improved while still maintaining security.

When sessions are created, an entry for the session, with four tuples—source IP (SIP), destination IP (DIP), destination port (DP) and protocol, is created in an historical session cache. Upon subsequently receiving a first packet of a new session, this historical cache can identify the session as having the same tuples as a session that was previously authorized. The tuples—SIP, DIP, DP and protocol—of the packet are used for comparison. If there is a match, the preliminary checks, namely IP address check and spoof check for the first packet of a session, can be avoided.

An additional cache (in addition to an active traffic session cache), in particular, an historical session cache, of already approved traffic sessions is maintained. The additional cache stores four tuples, which need not include a source port, for each authorized session. The additional cache can also store a configuration identity that relates to creation of the entry with a certain version of the configuration parameters for the additional cache.

When a packet cannot be matched against the active session in the session table, the additional cache is consulted. Upon a match and valid configuration identity, first packet checks such as IP address validation checks and spoof checks can be avoided. When there is no match in the additional cache, the packet will undergo first packet checks. Subsequently when session is created, an additional cache entry shall also be created.

A global configuration identity is maintained and updated whenever there is an interface or route change. The additional cache entries get flushed when the global configuration identity gets updated.

A spoof check is performed for the first packet. The spoof check can include a reverse route lookup on the source IP address. By doing a hash lookup on four tuples this step is made deterministic, and hence cycles can be saved and will result in better connection rate.

Traffic characteristics are used to create a predictive cache. The predictive cache, by establishing trust for new sessions based on trust previously established for previous sessions, can help avoid first packet checks such as IP address validation and spoof checks and establish sessions faster. Thus, the processing load on a processing core can be reduced during connection setup time.

In accordance with one embodiment, a packet processing system is implemented in hardware as electronic circuits, such a memory subsystem that stores historical session cache entries in a historical session cache, a configuration identity management circuit that relates a configuration identity to a set of tuples for an historical session cache entry and that flushes the historical session cache upon a global configuration identity update, a hashing circuit that creates a hash value representative of a set of tuples and a configuration identity, a tuple extraction circuit that extracts a set of tuples from a packet, a comparison circuit that compares the extracted set of tuples to each hash value, a security check circuit that causes a security check to be performed in response to the comparison circuit determining the extracted set of tuples not to match any of the hash values, and a packet dispatching circuit for sending out packets after processing. The electronic circuits can be used, for example, in a network firewall device, which is capable of enforcing security policies at a point in a network, for example, at a point between a WAN and a LAN. At least one embodiment can be practiced as a method in which previous session information is preserved in order to establish new sessions more quickly.

Performance improvement can be achieved by avoiding delays in session creation during security checks, such as occur during IP address checks and spoof checks. In practice, the traffic patterns to a server reveal repetitive connections from the same client to the server. Information about such repetitive connections is not retained in an active traffic session cache once a particular session ends, as the session is no longer an active traffic session at that point. As disclosed herein, a historical session cache is maintained to store historical session information about traffic sessions that have already been established. Such historical session information can be retained to beyond when its corresponding active session ends and can be used to predict the establishment of a future session from the same client to the same server based on the existence of a corresponding previous session. By assuring that security checks were performed on a historical session before saving the historical session information in the historical session cache, the historical session information can be regarded as representing sessions that can be trusted. Thus, subsequent sessions whose attributes match previously checked historical sessions represented by historical session information can be set up as authorized sessions without the need to perform another iteration of the same security checks that were previously performed. Such pre-authorization of proposed new sessions can then eliminate some of the delays that would otherwise occur in processing the first packet of a subsequent session during the session creation process.

Figure 1:
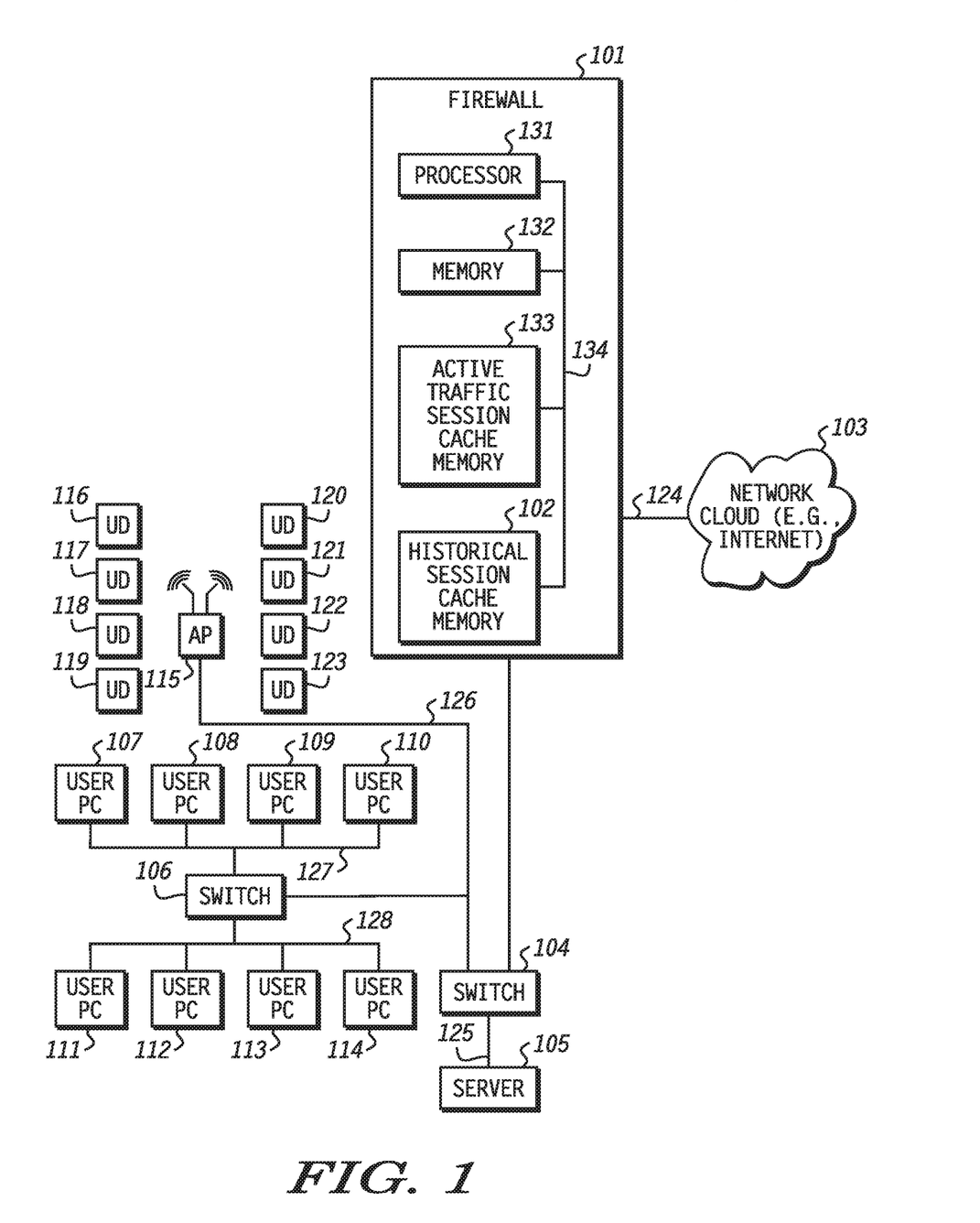
FIG. 1 is a block diagram illustrating a system comprising a firewall having an historical session cache according to one embodiment.

FIG. 1 is a block diagram illustrating a system comprising a firewall having an historical session cache according to one embodiment. System 100 comprises a firewall 101 having a processor 131, a program memory 132, an active traffic session cache memory 133, and a historical session cache memory 102 with such elements connected to one another via interconnect 134. System 100 can comprise other typical network components, such as switch 104, server 105, switch 106, user personal computers (PCs) 107-114, wireless access point (AP) 115, and user devices 116-123. Firewall 101 can provide data communication of the foregoing elements with a network cloud 103, such as the internet. On a wide area network (WAN) side, network cloud 103 is connected to firewall 101 via connection 124. On a local area network (LAN) side, firewall 101 is connected to switches 104 and 106 and AP 115 via connection 126. Switch 105 is connected to server 105 via connection 125. Switch 106 is connected to user PCs 107-110 via connection 127. Switch 106 is connected to user PCs 111-114 via connection 128. AP 115 is wirelessly connected to user devices 116-123.

When a user PC 107-114 or a user device 116-123 has traffic to send to a DIP in network cloud 103, the PC or device sends the packet via firewall 101. Firewall 101 processes the packet for transmission and dispatches the packet to network cloud 103. The processing can include, for example, security checks, ACL lookups and IPSec policy rule lookup. More processing to be performed on a packet can require more time and introduce more delay. Less processing can reduce the time and delay. An example of how processing can be performed is described below with reference to FIG. 2.

Figure 2:
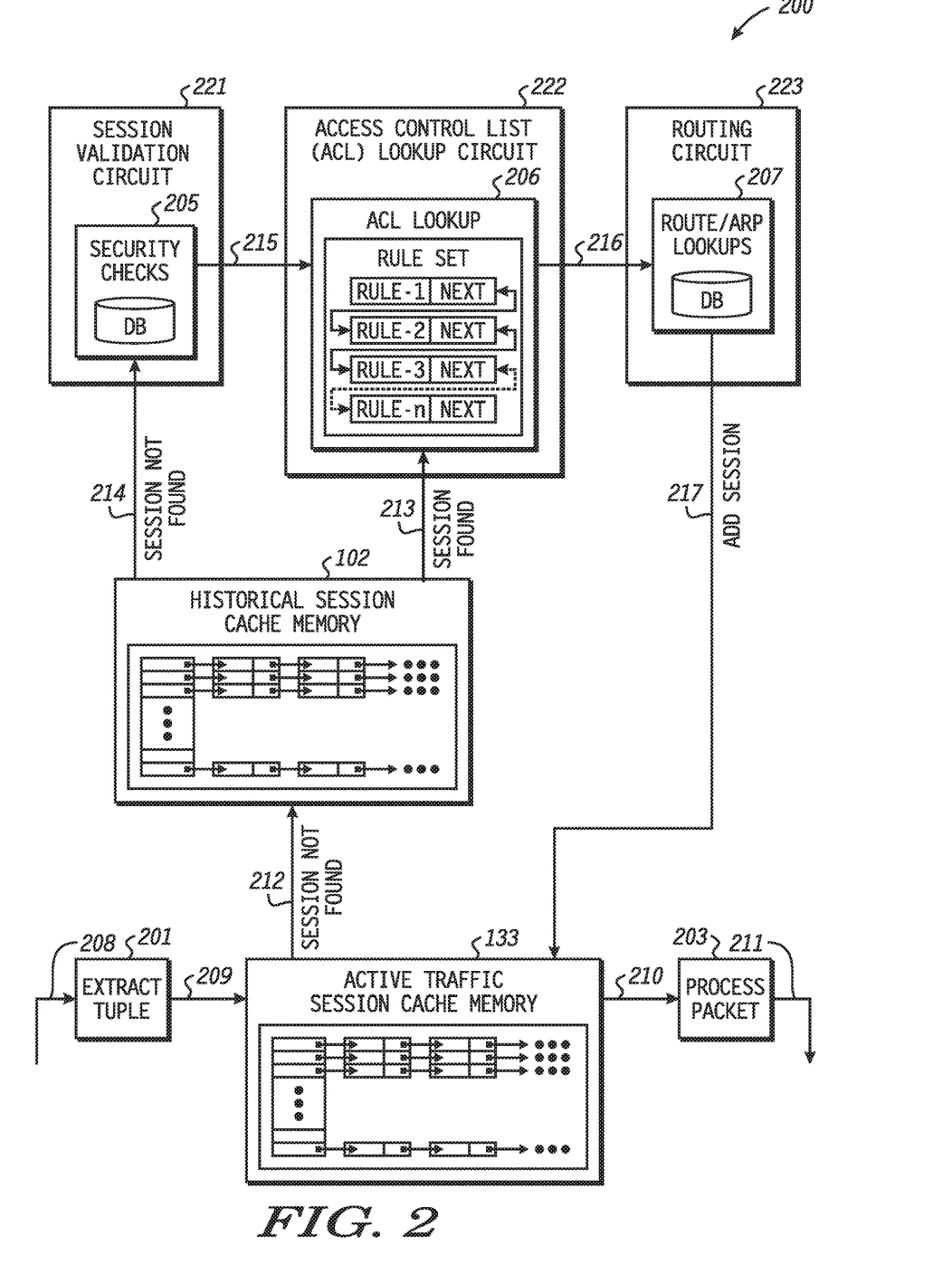
FIG. 2 is a block diagram illustrating processing flow within a firewall having an historical session cache according to one embodiment.

FIG. 2 is a block diagram illustrating processing flow within a firewall 200 having an historical session cache memory 102 according to one embodiment. Processing flow begins with a packet being provided at input 208. At tuple extraction circuit 201, the tuple comprising a SIP, DIP, DP, and protocol is extracted from the packet. The extracted tuple is provided to perform a session lookup at active traffic session cache memory 133 via path 209. If the session to which the tuple corresponds is found during the session lookup, the packet from which the tuple was extracted is allowed to proceed, and, therefore, forwarded via path 210 to packet processing circuit 203. At packet processing circuit 203, the packet is processed and dispatched via path 211.

If, however, no active session is found for the tuple at active traffic session cache memory 133, the tuple is provided via path 212 to historical session cache memory 102, and historical session cache memory 102 is searched for a session corresponding to the tuple. If a session is found in historical cache memory 102 for the tuple, the tuple is provided to ACL lookup circuit 222 via path 213. An access control list (ACL) lookup 206 is performed at ACL lookup circuit 222. If the ACL lookup is successful, the tuple is provided via path 216 to route/address resolution protocol (ARP) lookup circuit 223. At route/ARP lookup circuit 223, route and ARP lookups 207 are performed. From route/ARP lookup circuit 223, the information representative of the session to which the tuple corresponds is added to the historical session cache 102 and the information is also added to active traffic session cache memory 133 via path 217, as the session has been validated. From active traffic session cache memory 133, the packet from which the tuple was extracted is forwarded via path 210 to packet processing circuit 203. At packet processing circuit 203, the packet is processed and dispatched via path 211.

If, however, no session is found for the tuple at either active traffic session cache memory 133 or historical cache memory 102, the packet is forwarded to session validation 221 205, via path 214, for more time consuming security checks 205 to be performed on the packet. If the security checks 205 are successful, the packet is forwarded via path 215 to ACL lookup circuit 222 for ACL lookup 206 and subsequent processing as described above. The more time consuming security checks can include, for example, an IP address validity check. The IP address validity check can check, for example, if the destination IP address is a valid IP address. If a packet is destined for a wide-area network, such as the internet, but has a nonroutable destination IP address, the packet can be considered invalid. If a packet is received claiming to have a source IP address outside of a subnet specified for the interface at which the packet is received, the source IP address can be considered to be invalid. An IP address validity check requires time and computing resources. As another example, the security checks can include a spoof check, which can involve a reverse route lookup to the source IP address included in a packet that would initiate a session. The reverse route lookup can be used to determine if the source IP address set forth in the packet is likely to be representing itself as having come from a different source IP address. Its invalidity can be determined by performing a route lookup back to the source IP address to see if a valid route is available to the source IP address. While the route lookup can provide validity information, the route lookup requires time and computing resources. If a packet can be determined to be initiating a session likely to be legitimate without having to perform the security checks, the processing of the security checks does not need to be performed, saving time and computing resources. An example of data structures that may be used is described below with reference to FIG. 3.

Figure 3:
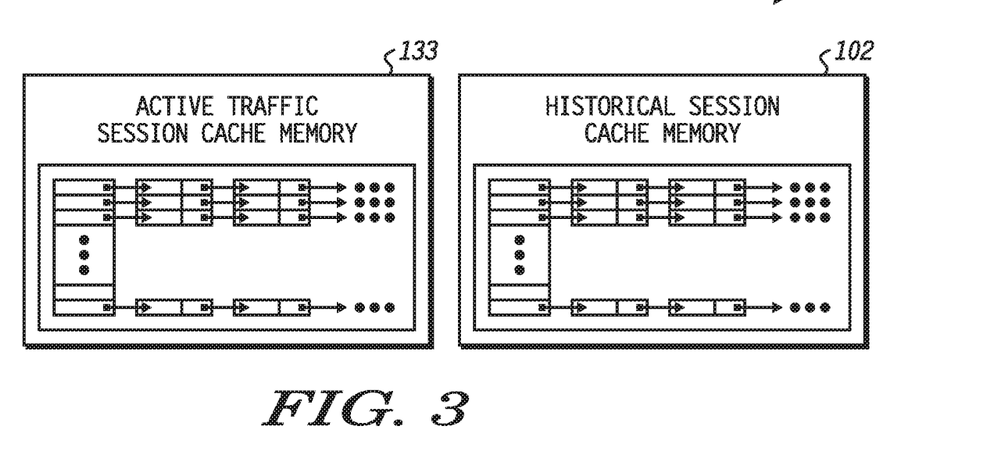
FIG. 3 is a block diagram illustrating data structures within a firewall having an historical session cache according to one embodiment.

FIG. 3 is a block diagram illustrating data structures within a firewall having a historical session cache according to one embodiment. Data structures 300 comprise active traffic session cache 133, which may be thought of as a tabular listing of active traffic sessions, and historical session cache 102, which can be used to predict which tuples represent legitimate sessions even if the original sessions corresponding to the same tuple may no longer be active. The tuples representing legitimate sessions can be retained in the historical session cache until their value in predicting a new legitimate session is impaired. For example, when an interface or route change occurs, historical session cache entries corresponding to the tuples can be invalidated.

Figure 4:
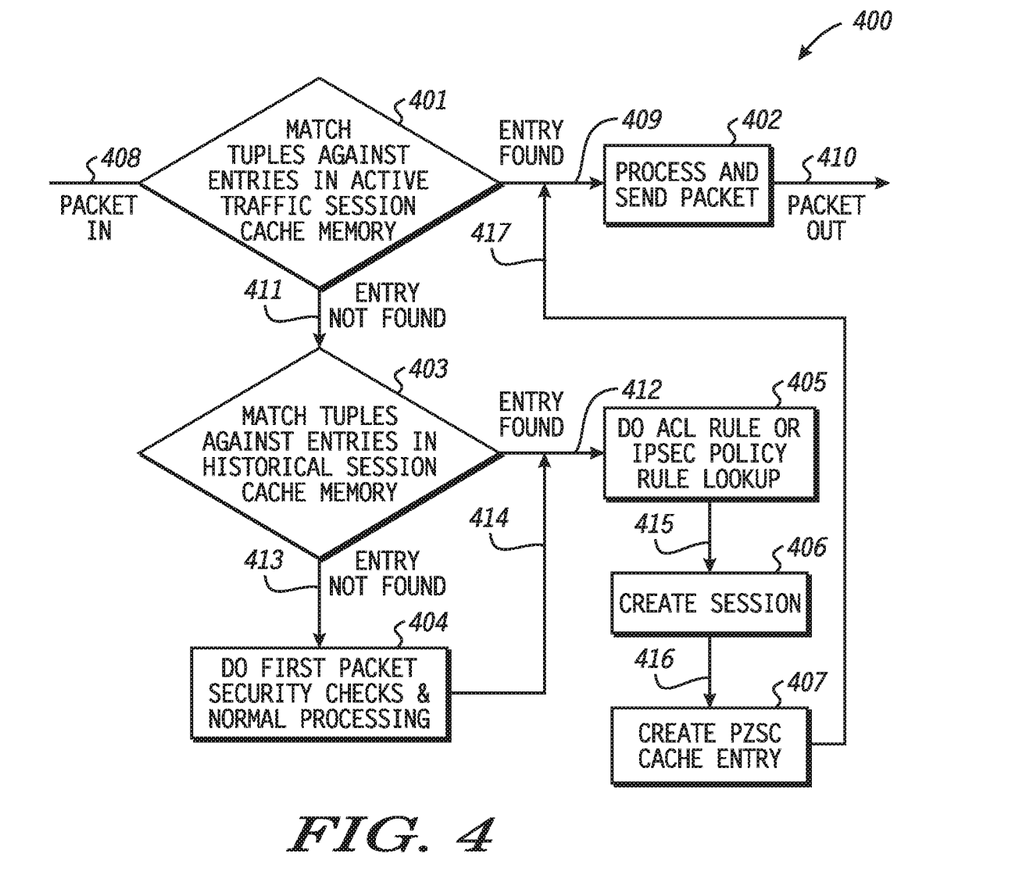
FIG. 4 is a flow diagram illustrating a method for packet processing in a firewall having an historical session cache according to one embodiment.

FIG. 4 is a flow diagram illustrating a method for packet processing in a firewall having an historical session cache according to one embodiment. Method 400 begins with a packet being provided at input 408 to decision block 401. At decision block 401, a decision is made whether or not a tuple extracted from the packet matches any entries in an active traffic session table. If a matching entry is found, method 400 continues to block 402 via path 409. In block 402, the packet is processed and dispatched via path 410. If a matching entry is not found at decision block 401, method 400 continues via path 411 to decision block 403. At decision block 403, a decision is made whether or not the tuple matches any entries in a historical session cache. If so, method 400 continues along path 412 to block 405. If not, method 400 continues along path 413 to block 404. In block 404, security checks are performed on the packet. The security checks can include, for example, an IP address validity check to determine if the source IP address, the destination IP address, or both are valid IP addresses. Depending on whether the IP addresses pertain to nodes on the LAN side of the firewall or on the WAN side of the firewall, a determination of whether or not the IP addresses are among routable IP addresses or among nonroutable IP addresses can also be used in the validation of the IP addresses. As another example, the security checks can include a spoof check. The spoof check can include a reverse route lookup for the stated source IP address, which can help determine the validity of the source IP address. If the security checks are successful, method 400 continues along path 414 to block 405.

At block 405, an ACL rule or internet protocol security (IPSec) policy rule lookup is performed for the packet. If the ACL rule or IPSec policy rule lookup is successful, method 400 continues along path 415 to block 406. In block 406, the proposed session is allowed to be created. By allowing the session to be created, an entry for the session is created in the active traffic session cache. From block 406, method 400 continues along path 416 to block 407. In block 407, a historical session cache entry is created for the session in the historical session cache. From block 407, method 400 continues via path 417 to block 402. In block 402, the packet is processed and dispatched via path 410.

One embodiment a historical session cache stores four tuples associated with the session. These four tuples can be used in a lookup to determine whether a security check, such as an IP address check or spoof check, needs to be performed to create a session entry in the active session cache. The historical session cache can also store a configuration identity for each session, e.g., for each of the four tuples. The configuration identity relates the creation of the entry to a particular version of a configuration of the historical session cache. Cache flushing is strategically performed on the historical traffic session cache in order to maintain the information for establishment of subsequent sessions. A global configuration identity is maintained in the firewall and updated whenever there is an interface or route change. For example, if the path to the internet changes from being provided by one network interface to being provided by another network interface, the global configuration identity is updated (e.g., changed to a different value) As another example, if the routing applied to the packets of a session changes, the global identity is updated. Historical session cache entries are flushed when the global configuration identity is updated. The global configuration identity and historical session cache entry based local configuration identity provide a mechanism to determine if the historical session cache entry is still valid or not. When an historical session cache entry is created, it is tied to a particular configuration of the routing database, whose identity is marked by the global configuration identity. Subsequently, a change in configuration of the routing database results in the global configuration identity being updated. When an historical session cache entry is accessed, its historical session cache entry based local configuration identity is checked each time to determine whether it matches the global configuration identity. If it does not match, the historical session cache entry is considered to be stale and be removed.

In accordance with at least one embodiment, an apparatus comprises an active traffic session cache memory, an historical session cache memory, a session validation circuit, an access control list (ACL) lookup circuit, and a routing circuit. The active traffic session cache memory is configured to store a first set of session parameter values for active traffic sessions. The historical session cache memory is configured to store a second set of session parameter values for traffic sessions, wherein the second set of session parameter values for traffic sessions persists after the traffic sessions are no longer active. The session validation circuit is communicatively coupled to the historical session cache memory and is configured to validate new sessions whose session parameters values are not stored in the historical session cache memory. The access control list (ACL) lookup circuit is communicatively coupled to the session validation circuit and is configured to perform ACL lookups for the new sessions validated by the session validation circuit and for historically qualified sessions whose session parameter values are stored in the historical session cache memory. The routing circuit is communicatively coupled to the ACL lookup circuit and is configured to route packets in response to successful completion of the ACL lookups.

In accordance with at least one embodiment, the second set of session parameter values comprise a source interne protocol (IP) address, a destination IP address, a destination port number, and a protocol identifier. In accordance with at least one embodiment, an entry is stored in the historical session cache memory for a new session of the new sessions in response to successful validation of the new session. In accordance with at least one embodiment, historical session entries of the historical session cache memory are invalidated in response to a global configuration identify update. In accordance with at least one embodiment, spoof checking is determined to be unnecessary for historically qualified sessions whose parameter values are stored in the historical session cache memory. In accordance with at least one embodiment, IP address validation is determined to be unnecessary for historically qualified sessions whose parameter values are stored in the historical session cache memory. In accordance with at least one embodiment, a hash lookup is used to identify historically qualified sessions whose parameter values are stored in the historical session cache memory.

In accordance with at least one embodiment, a method comprises receiving packets, routing the packets in response to the session parameter values matching an active traffic session entry of the active traffic session entries in an active traffic session cache memory, matching the session parameter values against historical session entries in an historical session cache memory in response to the session parameter values not matching any active traffic session entry of the active traffic session entries in the active traffic session cache memory, and, in response to the session parameter values not matching any historical session entry of the historical session entries in the historical session cache memory, performing a packet security check on the packets. The packets comprise headers, and the headers comprise session parameter values. The historical session entries for traffic sessions in the historical session cache memory persist after the traffic sessions are no longer active.

In accordance with at least one embodiment, the second set of session parameter values comprise a source interne protocol (IP) address, a destination IP address, a destination port number, and a protocol identifier. In accordance with at least one embodiment, the method further comprises storing an entry in the historical session cache memory for a new session of the new sessions in response to successful validation of the new session. In accordance with at least one embodiment, the method further comprises invalidating historical session entries of the historical session cache memory in response to a global configuration identify update. In accordance with at least one embodiment, the method further comprises, in response to the session parameter values matching an historical session entry of the historical session entries in the historical session cache memory, or when the packet security check has been completed successfully, performing an access control list (ACL) lookup. In accordance with at least one embodiment, the method further comprises creating a session corresponding to the session parameter values and, in response to the packet security check having been completed successfully, adding an entry for the session to the historical session cache memory. In accordance with at least one embodiment, a hash lookup is used to identify historically qualified sessions whose parameter values are stored in the historical session cache memory.

In accordance with at least one embodiment, an apparatus comprises a first memory configured to store an active traffic session cache having active traffic session entries for active traffic sessions, a first circuit coupled to the first memory, a second memory configured to store an historical session cache, and a second circuit coupled to the second memory. The first circuit is configured to compare four tuples comprising a source address, a destination address, a destination port identifier, and a protocol identifier to the active traffic session entries, wherein the four tuples are extracted from a packet directed toward a network cloud, wherein the packet is an initial packet for establishing a session, and, when the first circuit determines the four tuples to correspond to an active traffic session of the active traffic sessions, to dispatch the packet to the network cloud. The historical session entries for historical traffic sessions in the historical session cache persist after the historical traffic sessions are no longer active. The second circuit is configured to compare the four tuples to the historical session entries, and, when the second circuit determines the four tuples to correspond to an historical traffic session of the historical traffic sessions, to dispatch the packet to the network cloud.

In accordance with at least one embodiment, when the second circuit determines the four tuples differ from all of the historical traffic sessions in the historical session cache, a security check is performed on the packet, wherein the security check is otherwise avoided for packets whose tuples correspond to the historical traffic sessions. In accordance with at least one embodiment, a new historical session entry is stored in the historical session cache for a new session in response to successful validation of the new session. In accordance with at least one embodiment, the historical session entries of the historical session cache are invalidated in response to a global configuration identify update. In accordance with at least one embodiment, spoof checking is avoided for the historical traffic sessions whose historical session entries are stored in the historical session cache. In accordance with at least one embodiment, IP address validation is avoided for the historical traffic sessions whose historical session entries are stored in the historical session cache.

The concepts of the present disclosure have been described above with reference to specific embodiments. However, one of ordinary skill in the art will appreciate that various modifications and changes can be made without departing from the scope of the present disclosure as set forth in the claims below. In particular, the information descriptive of a session, the manner in which it is represented, the form of the elements implementing an embodiment, and other attributes described above may be varied according to different embodiments. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. An apparatus comprising:
    a processor;
    an active traffic session cache memory, coupled to the processor, and configured to store a first set of session parameter values for active traffic sessions, wherein the processor is configured to
        compare a tuple extracted from a packet with the first set of session parameter values, and
        provide the packet to a packet processing circuit in response to the tuple matching one of the first set of session parameter values;
    an historical session cache memory configured to store a second set of session parameter values for traffic sessions, wherein
        the second set of session parameter values for traffic sessions persists after the traffic sessions are no longer active, and
        the processor is configured to compare the tuple extracted from the packet with the second set of session parameter values after determining the tuple had no matches in the first set of session parameter values,
        each historical session cache entry of the historical session cache memory comprises an associated local configuration identity,
        each local configuration identity corresponds to a global configuration identity of the apparatus at a time the associated historical session cache entry is created, and
        historical session entries of the historical session cache memory are invalidated in response to a mismatch between the associated local configuration identity and a current global configuration identity;
    a session validation circuit communicatively coupled to the historical session cache memory is configured to validate new sessions after the processor determines the tuple had no matches in the second set of session parameter values;
    an access control list (ACL) lookup circuit communicatively coupled to the session validation circuit and the processor is configured to perform ACL lookups for the new sessions validated by the session validation circuit and for historically qualified sessions whose session parameter values are stored in the historical session cache memory; and
    a routing circuit communicatively coupled to the ACL lookup circuit is configured to perform routing lookups for packets in response to successful completion of the ACL lookups and provide session information to the active traffic session cache memory, wherein the packet is subsequently provided to the packet processing circuit.

2. The apparatus of claim 1 wherein the second set of session parameter values comprise a source internet protocol (IP) address, a destination IP address, a destination port number, and a protocol identifier.

3. The apparatus of claim 1 wherein an entry is stored in the historical session cache memory for a new session of the new sessions in response to successful validation of the new session.

4. The apparatus of claim 1 wherein spoof checking is determined to be unnecessary for historically qualified sessions whose parameter values are stored in the historical session cache memory.

5. The apparatus of claim 1 wherein IP address validation is determined to be unnecessary for historically qualified sessions whose parameter values are stored in the historical session cache memory.

6. The apparatus of claim 1 wherein a hash lookup is used to identify historically qualified sessions whose parameter values are stored in the historical session cache memory.

7. A method comprising:
    receiving packets, wherein the packets comprise headers, and the headers comprise session parameter values;
    routing the packets in response to the session parameter values matching an active traffic session entry of the active traffic session entries in an active traffic session cache memory;
    matching the session parameter values against historical session entries in an historical session cache memory in response to the session parameter values not matching any active traffic session entry of the active traffic session entries in the active traffic session cache memory, wherein
        the historical session entries for traffic sessions in the historical session cache memory persist after the traffic sessions are no longer active,
        an associated local configuration identity is stored with each historical session cache entry of the historical session cache memory,
        the local configuration identity corresponds to a global configuration identity at a time the associated historical cache entry is created,
        the historical session entries are invalidated in response to a mismatch between the associated local configuration identity of the entry and a current global configuration identity;
    routing the packets in response to the session parameter values matching an historical session entry; and
    in response to the session parameter values not matching any historical session entry of the historical session entries in the historical session cache memory, performing a packet security check on the packets and routing the packets in response to results of the packet security check.

8. The method of claim 7 wherein the session parameter values comprise a source internet protocol (IP) address, a destination IP address, a destination port number, and a protocol identifier.

9. The method of claim 7 further comprising storing an entry in the historical session cache memory for a new session of the new sessions in response to successful validation of the new session.

10. The method of claim 7 further comprising:
    in response to the session parameter values matching an historical session entry of the historical session entries in the historical session cache memory, or when the packet security check has been completed successfully, performing an access control list (ACL) lookup.

11. The method of claim 7 further comprising:
creating a session corresponding to the session parameter values; and
in response to the packet security check having been completed successfully, adding an entry for the session to the historical session cache memory.

12. The method of claim 7 wherein a hash lookup is used to identify historically qualified sessions whose parameter values are stored in the historical session cache memory.

13. An apparatus comprising
a first memory configured to store an active traffic session cache having active traffic session entries for active traffic sessions;
a first circuit coupled to the first memory and configured to compare four tuples comprising a source address, a destination address, a destination port identifier, and a protocol identifier to the active traffic session entries, wherein the four tuples are extracted from a packet directed toward a network cloud, wherein the packet is an initial packet for establishing a session, and, when the first circuit determines the four tuples to correspond to an active traffic session of the active traffic sessions, to dispatch the packet to the network cloud;
a second memory configured to store an historical session cache, wherein
the historical session entries for historical traffic sessions in the historical session cache persist after the historical traffic sessions are no longer active,
each historical session cache entry of the historical session cache memory comprises an associated local configuration identity,
each local configuration identity corresponds to a global configuration identity of the apparatus at a time the associated historical session cache entry is created, and
historical session entries of the historical session cache memory are invalidated in response to a mismatch between the associated local configuration identity and a current global configuration identity; and
a second circuit coupled to the second memory and configured to compare the four tuples to the historical session entries only in response to the first circuit failing to find a match for the four tuples in the active traffic session entries, and, when the second circuit determines the four tuples to correspond to an historical traffic session of the historical traffic sessions, to dispatch the packet to the network cloud.

14. The apparatus of claim 13 wherein, when the second circuit determines the four tuples differ from all of the historical traffic sessions in the historical session cache, a security check is performed on the packet, wherein the security check is otherwise avoided for packets whose tuples correspond to the historical traffic sessions.

15. The apparatus of claim 13 wherein a new historical session entry is stored in the historical session cache for a new session in response to successful validation of the new session.

16. The apparatus of claim 13 wherein spoof checking is avoided for the historical traffic sessions whose historical session entries are stored in the historical session cache.

17. The apparatus of claim 13 wherein IP address validation is avoided for the historical traffic sessions whose historical session entries are stored in the historical session cache.

* * * * *